Patented Jan. 1, 1952

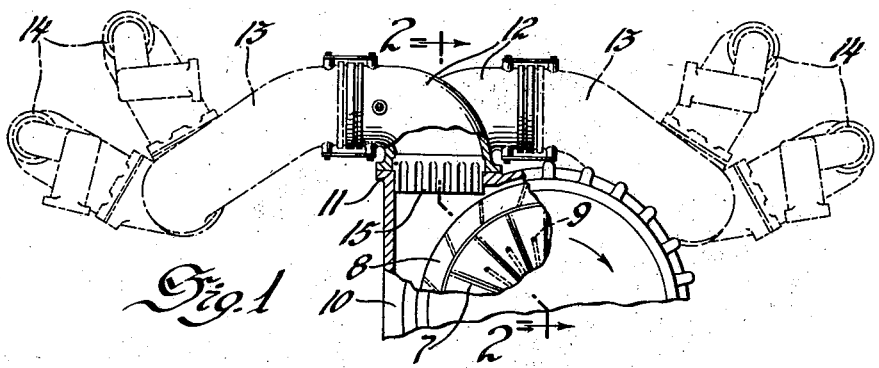
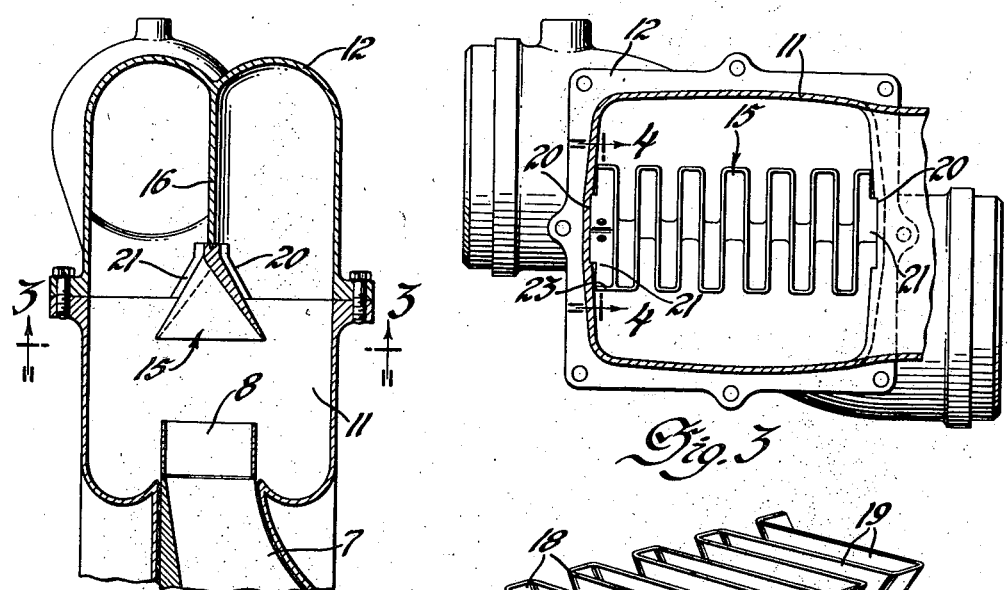
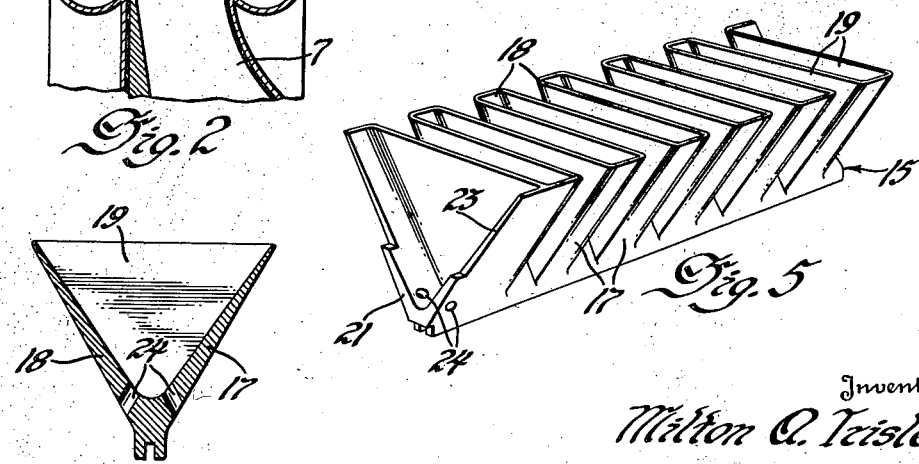

2,580,706

UNITED STATES PATENT OFFICE 2,580,706

FUEL SUPPLY SYSTEM

Milton A. Trisler, Detroit, Mich., assignor to General Motors Corporation, Detroit, Mich., a corporation of Delaware Application November 22, 1946, Serial No. 711,596

3 Claims. (Cl. 123—52)

My invention relates to improvements in the fuel supply system of an internal combustion engine, or more particularly to an intake manifold fuel distributor for an engine of the type in which two cylinders or groups of cylinders are supplied by separate conduits from a single fuel supply.

In conventional manifolds on this type of engine the fuel supply is divided by a straight partition in various types of T fittings. In a large multi-cylinder engine, this construction was found unsatisfactory in that the power output of each group of cylinders was not equal. An investigation disclosed that the richness of the fuel mixture was not uniform transversely throughout the conduit at the inlet side of the T, and that this transverse distribution of the fuel mixture varied with changes in engine operating conditions. Due to this transverse variation of the mixture, the richness of the fuel mixture supplied to each group of cylinders was not equal and the engine operation was uneven.

An object of my invention is to provide an improved intake manifold for multi-cylinder internal combustion engine to provide uniform fuel distribution to all the cylinders.

Another object of my invention is to provide an improved fuel mixture distributor which will divide a non-uniform fuel mixture into two parts having the same proportion of constituents as the mixture.

In the accompanying drawings there is illustrated a suitable mechanical embodiment of the improved fuel distributing system as applied to a double V-type engine. The drawings, however, are for the purpose of illustration only, and are not to be taken as limiting the invention since it will be apparent to those skilled in the art that various changes in the illustrated construction may be made without exceeding the scope of the invention. Although the fuel distributor of my invention may be advantageously used at any place or places in an intake manifold where the flow of one passage conduit is divided into two conduits and the stream mixture immediately upstream of the division is not homogeneous transversely of the conduit, whether because of a curve in the conduit, the action of a supercharger or for any other reason, it has been illustrated as applied to a supercharged double V type engine where this condition of non-uniform mixture has been found to be most severe.

In the drawings—

Figure 1 is a diagrammatic end view of the intake manifold and a portion of the supercharger of a double V-type engine.

Figure 2 is an enlarged cross section of the intake manifold T and supercharger on the line 2—2 of Figure 1.

Figure 3 is an enlarged cross section on the line 3—3 of Figure 2.

Figure 4 is an enlarged cross section of the fuel distributor in inverted position on the line 4—4 of Figure 3.

Figure 5 is an enlarged perspective view of the fuel distributor in inverted position.

The general arrangementt of the fuel supply system for an internal combustion engine is shown in Figure 1. In the system there is included a centrifugal supercharger which comprises an impeller 7 and a diffuser 8. The supercharger scroll 10 has an outlet passage 11 connected to the manifold T 12. Each branch of the T 12 is connected to a cross-over conduit 13 which leads to the runners 14 of the manifolds for two banks of cylinders. Fuel is introduced by a pump (not shown) into the inner ends of the radial passages 9 in the impeller 7, and is discharged from the outer ends of the passages into the spaces between the vanes of the impeller whence it passes with the air through the T 12, cross-over conduits 13 and runners 14 into the cylinders of the engine.

In this engine it was found that the fuel to air ratio in the mixture discharged from the impeller of the supercharger was not uniform transversely of the stream and, moreover, that the distribution of fuel transversely of the stream varied with changes in the speed of the impeller of the supercharger and the rate of flow of the mixture. Consequently, the cylinders connected to one branch of the T were supplied with a mixture which was richer or leaner than the mixture supplied to the cylinders connected to the other branch and the relation between the richness of the mixture supplied to the two sets of cylinders varied with changes in the speed of the impeller of the supercharger and the rate of flow of the mixture. To eliminate this undesirable condition the fuel distributor which is the subject of this application was devised.

The fuel distributor 15 is, as shown in Figure 5, a member shaped generally like a triangular prism which consists of a series of alternately and oppositely inclined directing elements 17 and 18 with triangular partition elements 19 connecting each edge of the element to the adjacent edge of the adjacent oppositely inclined element, in order to provide a plurality of transverse channels communicating with the branches. The channels have openings or pockets at the lower end and an upwardly and transversely extending duct or channel portion.

The fuel distributor is equal in length to the T and somewhat wider at its base than the diffuser, and is installed in the T parallel to the central partition 16 in the T and the diffuser and directly above the diffuser with the lower edge of the partition in a groove in a rib which extends along its apex and into which the directing elements 17 and 18 and the triangular partition elements 19 merge.

The fuel distributor is attached to the central partition 16 and/or the end walls of the T by suitable means such as an integral construction, welding or riveting. The end walls of the T may have flat recesses 20 to receive projections 21 on the ends of the distributor to provide close fits suitable for brazing.

In passing from the scroll of the supercharger into the T the air with the greater part of the fuel in it, of course, enters the spaces between the triangular partition elements 19 of the fuel distributor, and half of this portion of the air with the fuel in it is, therefore, directed into each of the branches of the T. Consequently, even if there is more fuel in one portion than in another of this part of the stream, the same proportion of the fuel in it will pass into each of the branches.

The impeller of the supercharger deposits liquid fuel on the outer wall of the scroll and the air discharged by the impeller sweeps this fuel along the wall into the T. To promote distribution of equal quantities of this liquid fuel to each side of the central partition in the T, there is provided opposite the inclined directing element 18 at the end of the fuel distributor nearest the outer wall of the scroll another directing element 23 inclined in the same direction as the directing elements 17, and which is joined to the same triangular partition element as the directing element 18 last referred to, and also merges into the rib which extends along the apex of the distributor. In the directing element 23 and the directing element 18 last referred to there are provided, near their junctions with the rib, apertures 24. These directing elements, the triangular partition element 19 to which they are joined and the outer wall of the scroll form a pocket into which the greater part of the liquid fuel deposited on the outer wall of the scroll by the impeller of the supercharger is swept and from which substantially equal portions of the liquid fuel are discharged into the T on each side of the central partition through the aperture 24.

The optimum width of the divider is determined by considering the fact that the increased width increases the conduit resistance to the flow of the fuel mixture, thus decreasing engine efficiency and at the same time provides a more perfect division of the fuel mixture into parts of equal richness, thus increasing engine efficiency. However, since the greater part of the fuel is concentrated in the portion of the mixture adjacent the plane of the impeller of the supercharger, a near perfect division of the mixture may be obtained with a distributor about half the width of the conduit, and the resistance to flow will be greatly reduced. Thus with a distributor about the same width as the supercharger diffuser optimum conditions of substantially perfect fuel mixture distribution and low flow resistance can be obtained. However, it is pointed out that the width of the distributor may be increased if more perfect fuel distribution is desired or decreased if less resistance to flow is desired.

Various modifications may be made as will occur to those skilled in the art without departing from the spirit of my invention or from the scope of the appended claims.

I claim:

1. In an internal combustion engine with a plurality of cylinders, a conduit with a plurality of branches, said branches being connected to said cylinders, a centrifugal supercharger having an impeller connected to said conduit, a divider member positioned in said conduit, said divider member having a plurality of pockets positioned symmetrically about the longitudinal axis of the divider, a passage connecting each of said pockets to one of said branches, the longitudinal axis of said divider being in the central plane of said supercharger impeller, and said divider having a width at least half the width of said supercharger impeller.

2. In an internal combustion engine having two cylinders, an intake manifold consisting of an inlet passage having side walls, a wall dividing said inlet passage into two branch outlet passages of which each communicates with one of the cylinders, a centrifugal supercharger having an impeller connected to said inlet passage, the plane of said impeller being substantially parallel to and in alignment with said dividing wall a distributor positioned on said dividing wall and consisting of a series of transverse channels, the end channel being formed by a side wall of said inlet passage and the divider, means connecting said end channel to both sides of said dividing wall, and means connecting the other channels alternately to opposite sides of said dividing wall and in communication with said branch outlet passages.

3. In an internal combustion engine having two cylinders, an intake manifold consisting of an inlet passage having side walls, a wall dividing said inlet passage into two branch outlet passages of which each communicates with one of the cylinders, a centrifugal supercharger having an impeller connected to said inlet passage, the plane of said impeller being substantially parallel to and in alignment with said dividing wall a distributor positioned on said dividing wall and consisting of a series of transverse channels, the end channel being formed by a side wall of said inlet passage and the divider, said end channel being closed by side channel walls meeting at said dividing wall, an outlet aperture in each side channel wall adjacent the dividing wall to equally divide the wet fuel on the side wall of the inlet passage which enters said end channel, and means connecting the other channels alternately to opposite sides of said dividing wall and in communication with said branch outlet passages.

MILTON A. TRISLER.

REFERENCES CITED

The following references are of record in the file of this patent:

UNITED STATES PATENTS

| Number | Name | Date |
|---|---|---|
| 1,122,121 | Huff | Dec. 22, 1914 |
| 1,354,747 | Hiller | Oct. 5, 1920 |

(Other references on following page)

UNITED STATES PATENTS

| Number | Name | Date |
|---|---|---|
| 1,395,938 | Barducci | Nov. 1, 1921 |
| 1,512,311 | Ricardo | Oct. 21, 1924 |
| 1,757,634 | Jacques | May 6, 1930 |
| 1,765,278 | Lavergne | June 17, 1930 |
| 1,769,281 | Zubaty | July 1, 1930 |
| 1,788,337 | Scott | Jan. 6, 1931 |
| 1,793,509 | Purdy | Feb. 24, 1931 |
| 1,889,816 | White | Dec. 6, 1932 |
| 1,913,980 | Fisher | June 13, 1933 |
| 1,929,637 | Hall | Oct. 10, 1933 |
| 1,933,380 | Mock et al. | Oct. 31, 1933 |
| 2,283,644 | Nallinger | May 19, 1942 |
| 2,289,231 | Auger et al. | July 7, 1942 |
| 2,297,910 | Neuland | Oct. 6, 1942 |
| 2,400,617 | Wheller | May 21, 1946 |

FOREIGN PATENTS

| Number | Country | Date |
|---|---|---|
| 504,947 | Germany | Aug. 9, 1930 |